United States Patent
Brooker et al.

(10) Patent No.: US 10,528,390 B2
(45) Date of Patent: ***Jan. 7, 2020

(54) IDEMPOTENT TASK EXECUTION IN ON-DEMAND NETWORK CODE EXECUTION SYSTEMS

(71) Applicant: Amazon Technologies, Inc., Seattle, WA (US)

(72) Inventors: Marc John Brooker, Seattle, WA (US); Timothy Allen Wagner, Seattle, WA (US); Ajay Nair, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,887

(22) Filed: Aug. 27, 2018

(65) Prior Publication Data

US 2019/0205171 A1 Jul. 4, 2019

Related U.S. Application Data

(63) Continuation of application No. 15/275,228, filed on Sep. 23, 2016, now Pat. No. 10,061,613.

(51) Int. Cl.
*G06F 9/455* (2018.01)
*G06F 9/50* (2006.01)
*G06F 9/445* (2018.01)

(52) U.S. Cl.
CPC ............ *G06F 9/5005* (2013.01); *G06F 9/445* (2013.01)

(58) Field of Classification Search
CPC ............... G06F 9/3851; G06F 11/1407; G06F 11/1464; G06F 11/3612;
(Continued)

(56) References Cited

U.S. PATENT DOCUMENTS

| 4,949,254 A | 8/1990 | Shorter |
| 5,283,888 A | 2/1994 | Dao et al. |

(Continued)

FOREIGN PATENT DOCUMENTS

| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Dong U Kim
(74) *Attorney, Agent, or Firm* — Knobbe, Martens, Olson & Bear, LLP

(57) ABSTRACT

Systems and methods are described for handling requests to execute idempotent code in an on-demand code execution system or other distributed code execution environment. Idempotent code can generally include code that produces the same outcome even when executed multiple times, so long as dependencies for the code are in the same state as during a prior execution. Due to this feature, multiple executions of idempotent code may inefficiently use computing resources, particularly in on-demand code execution system (which may require, for example, generation and provisioning of an appropriate execution environment for the code). Aspects of the present disclosure enable the on-demand code execution system to process requests to execute code by verifying whether dependency states associated with the code have changed since a prior execution. If dependency states have not changed, no execution need (Continued)

occur, and the overall computing resource us of the on-demand code execution system is decreased.

21 Claims, 5 Drawing Sheets

(58) Field of Classification Search
CPC ....... G06F 2009/45562; G06F 9/30058; G06F 9/30145; G06F 9/45516; G06F 9/45558; G06F 9/485; G06F 9/5077
See application file for complete search history.

(56) References Cited

U.S. PATENT DOCUMENTS

| | | |
|---|---|---|
| 5,970,488 A | 10/1999 | Crowe et al. |
| 6,385,636 B1 | 5/2002 | Suzuki |
| 6,463,509 B1 | 10/2002 | Teoman et al. |
| 6,708,276 B1 | 3/2004 | Yarsa et al. |
| 7,036,121 B1 | 4/2006 | Casabona et al. |
| 7,590,806 B2 * | 9/2009 | Harris ................ G06F 8/443 711/154 |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 * | 2/2011 | Scheifler .............. G06F 9/485 709/217 |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 * | 8/2014 | Azari ................ G06F 16/1748 707/688 |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,112,813 B2 | 8/2015 | Jackson |
| 9,146,764 B1 | 9/2015 | Wagner |
| 9,152,406 B2 | 10/2015 | De et al. |
| 9,164,754 B1 * | 10/2015 | Pohlack .................. G06F 8/658 |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 * | 9/2017 | Ghose .................. G06F 9/3851 |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,952,896 B2 | 4/2018 | Wagner et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0098154 A1 | 5/2004 | McCarthy |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0220009 A1 | 9/2007 | Morris et al. |
| 2007/0255604 A1 | 11/2007 | Seelig |
| 2008/0028409 A1 | 1/2008 | Cherkasova et al. |

(56) References Cited

U.S. PATENT DOCUMENTS

| | | |
|---|---|---|
| 2008/0052725 A1* | 2/2008 | Stoodley ............ G06F 9/3851 718/107 |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0147893 A1 | 6/2008 | Marripudi et al. |
| 2008/0189468 A1 | 8/2008 | Schmidt et al. |
| 2008/0201711 A1 | 8/2008 | Amir Husain |
| 2008/0209423 A1 | 8/2008 | Hirai |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1* | 5/2010 | Cheriton ............ G06F 9/4496 717/146 |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1* | 1/2014 | Menon ............... G06F 9/4812 712/228 |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |

(56) References Cited

U.S. PATENT DOCUMENTS

| | | |
|---|---|---|
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0040229 A1* | 2/2015 | Chan .................. G06F 21/577 726/25 |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0199218 A1 | 7/2015 | Wilson et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1* | 12/2015 | Tan .................. G06F 8/427 726/22 |
| 2015/0363181 A1 | 12/2015 | Alberti et al. |
| 2015/0370560 A1* | 12/2015 | Tan .................. G06F 9/30058 717/148 |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0026486 A1 | 1/2016 | Abdallah |
| 2016/0072727 A1 | 3/2016 | Leafe et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0140180 A1 | 5/2016 | Park et al. |
| 2016/0191420 A1 | 6/2016 | Nagarajan et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0364265 A1 | 12/2016 | Cao et al. |
| 2016/0371127 A1 | 12/2016 | Antony et al. |
| 2016/0371156 A1* | 12/2016 | Merriman ........... G06F 11/1448 |
| 2016/0378554 A1 | 12/2016 | Gummaraju et al. |
| 2017/0060621 A1* | 3/2017 | Whipple ............... G06F 9/5072 |
| 2017/0083381 A1 | 3/2017 | Cong et al. |
| 2017/0085447 A1 | 3/2017 | Chen et al. |
| 2017/0093920 A1 | 3/2017 | Ducatel et al. |
| 2017/0177391 A1 | 6/2017 | Wagner et al. |
| 2017/0206116 A1 | 7/2017 | Reque et al. |
| 2017/0286143 A1 | 10/2017 | Wagner et al. |
| 2017/0371703 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0039506 A1 | 2/2018 | Wagner et al. |
| 2018/0046482 A1* | 2/2018 | Karve ................. G06F 9/45558 |
| 2018/0121245 A1 | 5/2018 | Wagner et al. |
| 2018/0143865 A1 | 5/2018 | Wagner et al. |
| 2018/0157568 A1 | 6/2018 | Wagner |
| 2018/0203717 A1 | 7/2018 | Wagner et al. |
| 2018/0210760 A1 | 7/2018 | Wisniewski et al. |

FOREIGN PATENT DOCUMENTS

| | | |
|---|---|---|
| JP | 2006-107599 A | 4/2006 |
| JP | 2011257847 A | 12/2011 |
| WO | WO 2008/114454 A1 | 9/2008 |
| WO | WO 2009/137567 A1 | 11/2009 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, 2014, 13 pages.

Deis, Container, 2014, 1 page.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Hoffman, Auto scaling your website with Amazon Web Services (AWS)—Part 2, Cardinalpath, Sep. 2015, 15 pages.

Kamga et al., Extended scheduler for efficient frequency scaling in virtualized systems, Jul. 2012, 8 pages.

Kazempour et al., AASH: an asymmetry-aware scheduler for hypervisors, Jul. 2010, 12 pages.

Kraft et al., 10 performance prediction in consolidated virtualized environments, Mar. 2011, 12 pages.

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

Monteil, Coupling profile and historical methods to predict execution time of parallel applications. Parallel and Cloud Computing, 2013, <hal-01228236, pp. 81-89.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php+48 title+Shim_(computing)&oldid+654971528, [retrieved on May 26, 2016], 2 pages.

(56) References Cited

OTHER PUBLICATIONS

Stack Overflow, Creating a database connection pool, 2009, 4 pages.
Tan et al., Provisioning for large scale cloud computing services, Jun. 2012, 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
International Search Report and Written Opinion in PCT/US2015/052833 dated Jan. 13, 2016.
International Preliminary Report on Patentability in PCT/US2015/052833 dated Apr. 4, 2017.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.

* cited by examiner

IDEMPOTENT TASK EXECUTION IN ON-DEMAND NETWORK CODE EXECUTION SYSTEMS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
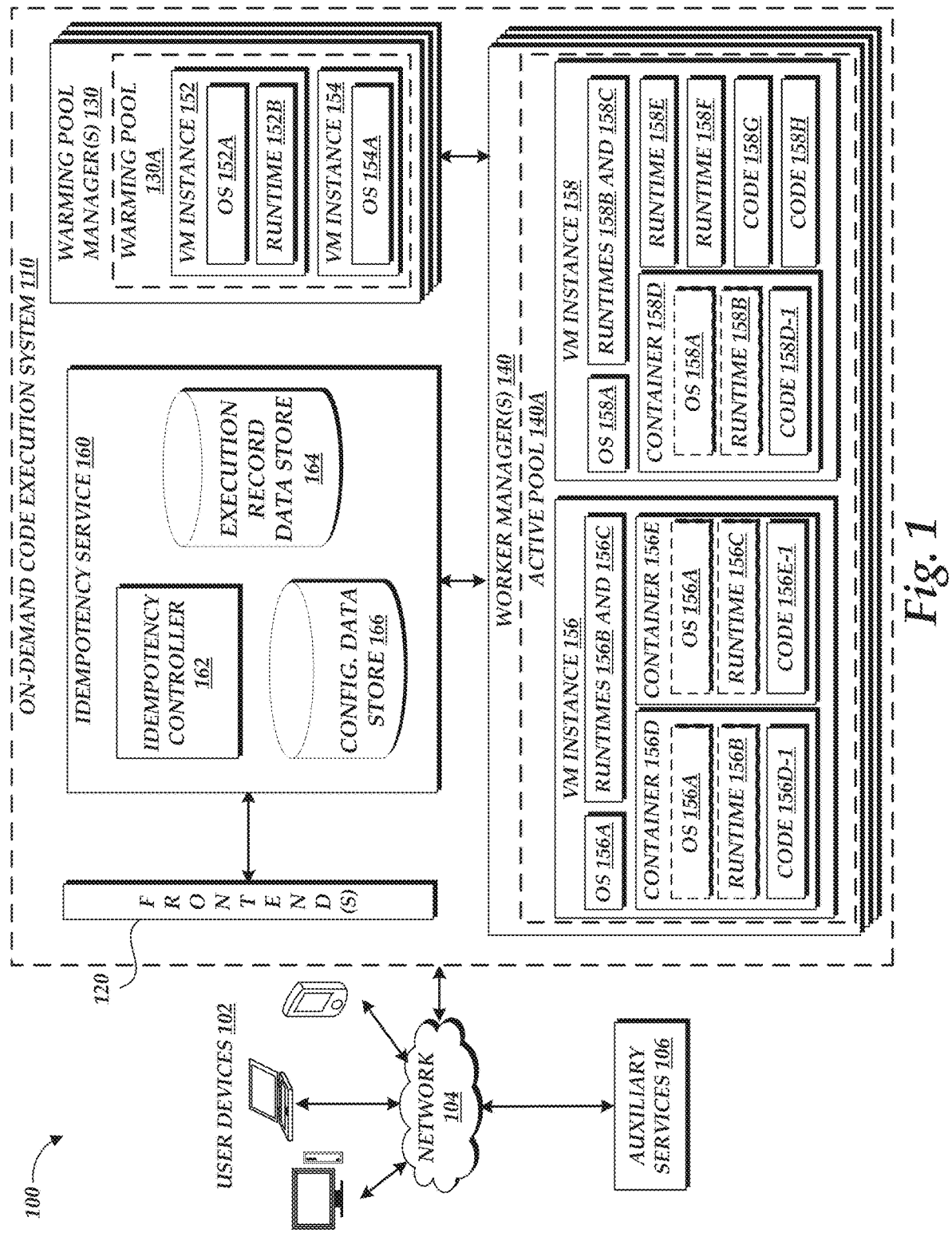
FIG. 1 is a block diagram depicting an illustrative environment in which an on-demand code execution environment can operate to idempotently execute tasks.

Generally described, aspects of the present disclosure relate to executing idempotent code in an on-demand code execution system in a manner that increases the efficiency and reduces execution redundancy between multiple requests to execute idempotent code, for example, by implementing "memoization" for executions of the code on the on-demand code execution system. As used herein, "idempotent" code generally refers to code that can be executed multiple times, with each execution producing the same results so long as the states of any resources on which the execution relies have not changed. For example, code to retrieve a source image and generate a corresponding thumbnail image may be considered idempotent if any number of calls to the code return the same thumbnail image, so long as the source image has not changed. In the context of an on-demand code execution system, it is generally inefficient to execute such code multiple times, when the source image has not varied since a prior execution. Accordingly, aspects of the present application enable an on-demand code execution system, prior to executing code that has been designated for idempotent execution, to determine whether the state of any dependencies of the code has changed. In the instance that no state of a dependency has changed, the on-demand code execution system may determine that subsequent execution of code would be unnecessary, and decline to execute the code. Thus, the on-demand code execution system can reduce the amount of computing resources needed to execute idempotent code, without any reduction in functionality.

As described in detail herein, an on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task. The on-demand code execution system can further enable users to trigger execution of a task based on a variety of potential events, such as transmission of an application programming interface ("API") call or a specially formatted hypertext transport protocol ("HTTP") packet. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

As discussed above, aspects of the present disclosure enable users to designate tasks for idempotent execution on the on-demand code execution system. In this regard, the on-demand code execution system can function to execute a task in response to a task call only when states of any dependencies of the task do not match states of those dependencies during a prior execution. This functionality may be considered a type of "memoization," a term that in computer science generally refers to an optimization technique whereby results of computationally expensive functions are cached, such that subsequent calls to the function can be serviced by the cached function. However, as explained in more detail below, the techniques described herein do not necessarily rely on caching of results as might occur in traditional memoization. Moreover, the techniques described herein may provide greater benefit than traditional memoization, in that implementation of these techniques on an on-demand code execution system can enable the system to decline to create execution environments in which to execute tasks, when such execution is determined to be unnecessary. Thus, the techniques described herein can eliminate use of not just the computing resources required to execute a specific function within code, but the computing resources required to create an execution environment in which to execute that code, to deploy the code to the execution environment, to invoke execution, etc. For example, where a task is used to process a source image and generate a corresponding thumbnail image, the on-demand code execution system may ignore repeated calls to execute the task, unless the source image is altered. As such, the on-demand code execution system may not be required to locate or generate an execution environment (e.g., virtual machine or contained) in which to execute the code, or to otherwise expend computing resources to execute the code, and the overall efficiency of the on-demand code execution system in handling redundant calls to execute an idempotent task may be increased. Further, efficient handling of calls to execute idempotent tasks (e.g., via implementation of memoization on the on-demand code execution environment) may allow for more intuitive use of the on-demand code execution system by users. For example, in the context of a "profile" page on a social networking site (e.g., a hypertext markup language, or "HTML" document), a user cause the page to display a thumbnail profile image by including a call to an idempotent task as client-side scripting within the page. Each time the page is loaded by a user, a call to the idempotent task may occur, referencing a source image (e.g., a full resolution profile image). However, the on-demand code execution system may decline to implement the task unless a corresponding source image has changed since the function was last called. In this way, a user (e.g., an administrator of the profile page) can ensure that thumbnail images are always up-to-date, while using little or no resources of the on-demand code execution system, except in instances where thumbnail images are updated.

In one embodiment, dependencies of a task may include absolute values of parameters passed to the task. For example, where parameters include absolute values (e.g., a string value to be processed by a task), the on-demand code execution system can detect that a state of the parameter-dependency has changed when the absolute value of the parameter has changed. Additionally or alternatively, dependencies of a task may include content referenced by parameters passed to the task. For example, where parameters include a reference to a file (e.g., via a uniform resource identifier, or URI), the on-demand code execution system can detect that a state of the parameter-dependency has changed when the referenced content (e.g., the file) is identical to content of the file during a past execution. The on-demand code execution system may compare contents of a file, for example, by comparing the absolute contents of a referenced resource (e.g., via a bit-by-bit comparison), by comparing representations of the contents, such as hash values or version numbers, or by reference to tracking information of the referenced resource, such as a "last changed" timestamp for the referenced resource. In some instances, the on-demand code execution system can itself verify whether a state of a referenced resource has changed since prior executions, such as by retrieving a hash value of the resource and comparing the hash value to a stored hash value of the resource for a prior execution. In other instances, the on-demand code execution system may rely on an external service, such as a resource endpoint for the resource, to verify whether a state of the resource has changed. For example, the on-demand code execution system may pass state information of a resource during a past execution (e.g., a version number) to the endpoint for the resource, and request that the endpoint notify the on-demand code execution system as to whether a state of the resource has changed since the past execution. For each parameter passed during calling of a task, the on-demand code execution system may determine whether a state of the parameter or a resource referenced by the parameter has changed since a prior execution. If so, the on-demand code execution system can execute the task, to account for any new outcome that may result from calling the task with parameters of a different state. If no state of a parameter (or resource referenced by a parameter) has changed, the on-demand code execution system can decline to execute the task in response to a call. In some instances, the on-demand code execution system may further notify a caller of the task (e.g., a client device) that execution will not occur, as a result of that execution is expected to be the same as a prior execution.

In addition to parameters, dependencies of a task may include code underlying the task itself. Illustratively, a given task on the on-demand code execution system may refer to a set of underlying code, which may be altered by a user owning the task. As such, execution of the task at a first point in time, such as prior to code alteration, may result in different outcomes than execution of the code at a second point in time. Accordingly, in response to a call to execute an idempotent task, the on-demand code execution system may verify that code of the task matches that of the prior execution. If so (and if the state of other dependencies has not changed), the on-demand code execution system may decline to execute the task. In the instance that states of any dependencies do not states during a prior execution, the on-demand code execution system may execute the task.

In some instances, additional dependencies may exist for a task. Illustratively, execution of a task may invoke, via code of the task, retrieval of external resources that alter how execution proceeds or the outcome of the execution. Accordingly, these external resources can be considered dependencies. Dependency on external resources may be identified, for example, where the external resources are manually specified by a creator of the task, or by automated analysis of code corresponding to the task (e.g., by use of static or dynamic analysis to identify calls to external resources). Static and dynamic analyses are broad terms having their ordinary meanings. As applied to the current disclosure, static analysis may involve, for example, inspecting code corresponding to the task to identify calls to external resources, such as application programming interface (API) calls. As applied to the current disclosure, dynamic analysis may include executing the code (or inspecting data regarding past executions of the code) to detect calls to external resources. After identifying external resources on which execution of a task depends, the on-demand code execution system may verify that a state of the external resource matches a state during prior execution. If so (and if the state of other dependencies has not changed), the on-demand code execution system may decline to execute the task. In the instance that states of any dependencies do not states during a prior execution, the on-demand code execution system may execute the task.

In still more instances, dependencies can include internal state of execution environments of the task. For example, where state of an execution environment for the task is preserved between task executions, state of the task or the execution environment may be considered a dependency, and the on-demand code execution system may determine whether or not to execute the task based on the state of the execution environment. In other instance, the on-demand code execution system may execute tasks "statelessly," and thus the internal state of an execution environment may not be considered a dependency (as tasks may be expected to operate without reference to that internal state).

In one embodiment, the on-demand code execution system may automatically determine one or more dependencies of a task, as well as how to compare states of that dependency between executions. For example, the on-demand code execution system may automatically retrieve any resources referenced by or included in parameters, and compare the resources (or an identifier of the resources, such as a hash value) to a record of the state of a resources during a prior execution. In another embodiment, a user associated with a task may specify one or more dependencies for a task. The user may additionally or alternatively specify how a state of the resource should be compared against the resource's state during a prior execution. For example, a user may specify that a given parameter should be considered a dependency, and that the parameter should be passed through a function (e.g., a hash function) and compared with a saved value for that function generated during a prior execution. As another example, a user may specify a specific resource (e.g., a URI) as a dependency, regardless of whether that resource is included as a parameter to the task. The user may further specify a function by which to compare a state of the resource to the state of the resource during prior executions. In some instances, multiple resources (e.g., identified by a parameter) may be considered as forming a part of a collective dependency. For example, where a task adds an item to a database, and both the item and database are referend by parameters of the function, a user may specify a query to the database that the on-demand code execution system should execute to determine whether a state has changed since a prior execution (e.g., a query requesting that the database determine whether the item is already included in the database).

The on-demand code execution system may provide a user interface (e.g., a command line interface, graphical user interface, etc.) by which users can specify dependencies directly, such as by specifying a resource, or variably, such as by reference to a parameter or other metadata value associated with a call to execute a task. The on-demand code execution system may further provide a user interface to specify how state of the resource should be compared with past functions. For example, the on-demand code execution system may enable a user to select from a set of defined comparison functions provided by the on-demand code execution system, or may enable a user to define their own function (e.g., as a task in its own right, as a hypertext transfer protocol [HTTP] request with defined responses indicating a result of the comparison, etc.).

To facilitate comparison between a current dependency state and state during a prior task execution, the on-demand code execution system may maintain information regarding the dependency's state during a prior execution, or other additional information enabling comparison of that state, such as a time of prior execution (which may be used, for example, to query a resource endpoint as to whether the resource has been altered since that time). In some instances, the on-demand code execution system may consider only the state of an immediately prior execution for the purposes of determining whether a task should be executed. In other instances, the on-demand code execution system may consider states during a number of prior executions, and may decline to execute a task if a set of dependency states during any given prior execution matches the set of current dependency states.

As will be appreciated by one of skill in the art in light of the present disclosure, the embodiments disclosed herein improves the ability of computing systems, such as on-demand code execution systems, to efficiently execute user-provided code in a rapid manner, and subject to execution constraints. Specifically, aspects of the present disclosure improve the ability of on-demand code execution systems to process multiple and potentially duplicative calls to execute an idempotent task, such that limited or no computing resources are needed to execute the task when that execution would not result in a different outcome than has already been accomplished by a prior execution. Moreover, the presently disclosed embodiments address technical problems inherent within computing systems, specifically, the limited computing resources available to execute code, and in the context of on-demand code execution systems, the additional overhead in computing resources necessitated by on-demand execution (e.g., location or creation of a suitable execution environment, provisioning of the environment with code of the task, etc.). These technical problems are addressed by the various technical solutions described herein, including the identification of dependencies of a task, and the comparison of states of such dependencies against states of those dependencies during prior execution, in order to determine whether additional execution would result in a different outcome. Thus, the present disclosure represents an improvement on existing code-execution environments and computing systems in general.

The execution of tasks on the on-demand code execution system will now be discussed. Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance.

The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The term "idempotent" task is generally used herein to refer to a task where multiple executions of the task would result in the same outcome, so long as the state of dependencies of the task has not varied. Other, potentially more narrow definitions of idempotency may exist in other contexts. For example, in mathematics, a unary operation may be considered idempotent if the operation applied multiple times to any given value returns the same result as if the unary operation were applied once (e.g., $abs(abs(x))=abs(x)$, where the abs( ) function returns the absolute value of a passed parameter). Aspects of the present disclosure can enable efficient implementation of functions meeting these more-narrow definitions of idempotency. However, aspects of the present disclosure can also enable efficient implementation of "idempotent" tasks more generally, even when the task would not satisfy other, more narrow definitions of idempotency.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102 and auxiliary services 106. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the on-demand code execution environment 110 or otherwise communicate to the one-demand code execution environment 110. For example, the auxiliary services 106 can include web services (e.g., associated with the user computing devices 102, with the on-demand code execution system 110, or with third parties), data bases, rich site summary ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. Components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The user computing devices 102 and auxiliary services 106 may communication with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1.

Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontends 120 may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontend 120 includes a variety of components (not shown in FIG. 1) to enable interaction between the on-demand code execution system 110 and other computing devices. For example, the frontend 120 can includes a request interface providing user computing devices 102 with the ability to upload or otherwise communication user-specified code to the on-demand code execution system 110 and to thereafter request execution of that code. In one embodiment, the request interfaces communicates with external computing devices (e.g., user computing devices 102, auxiliary services 106, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed.

A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can further include an execution queue (not shown in FIG. 1), which can maintain a record of user-requested task executions. Illustratively, the number of simultaneous task executions by the on-demand code execution system 110 is limited, and as such, new task executions initiated at the on-demand code execution system 110 (e.g., via an API call) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. The number and configuration of execution queues may in some instances be modified based on pre-trigger notifications received at the on-demand code execution system 110 (e.g., based on a predicted number of subsequent task calls to be received based on the pre-trigger notifications). In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 120). Alternatively or additionally, tasks may be triggered for execution at the on-demand code execution system 110 based on data retrieved from one or more auxiliary services 106. To facilitate interaction with auxiliary services 106, the frontend 120 can include a polling interface (not shown in FIG. 1), which operates to poll auxiliary services 106 for data. Illustratively, the polling interface may periodically transmit a request to one or more user-specified auxiliary services 106 to retrieve any newly available data (e.g., social network "posts," news articles, etc.), and to determine whether that data corresponds to a user-established criteria triggering execution a task on the on-demand code execution system 110. Illustratively, criteria for execution of a task may include, but is not limited to, whether new data is available at the auxiliary services 106, the type or content of the data, or timing information corresponding to the data. In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) or pre-trigger notifications (received pre-trigger notifications, actions taken based on pre-trigger notification, determined correlations between pre-trigger notifications and subsequent task executions, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. Calls may in some instances be distributed between frontends 120 deterministically, such that a given call to execute a task will always (or almost always) be routed to the same frontend 120. This may, for example, assist in maintaining an accurate execution record for a task. While distribution of calls via a load balancer is illustratively described, other distribution techniques, such as any cast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated on-demand code execution systems referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. Illustratively, to assist in implementation of execution, the location selector can select the same worker manager 140 to receive each call to a task to the same worker manager 140, such that the worker manager 140 can maintain an authoritative execution record for the task. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 patent, incorporated by reference above (e.g., at FIG. 4 of the '556 patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 can include an idempotency service 160 enabling the on-demand code execution system to implement efficient execution for idempotent tasks, by causing calls to execute a task to actually result in execution, only when a state of a dependency of the task does not match a state of the dependency during prior executions. Illustratively, the on-demand code execution system 110 can utilize the idempotency service 160 cause execution of a task in response to a task call only if at least one dependency of the task has a different state than during a prior execution (e.g., an immediately prior execution, any prior execution, a prior execution in a threshold past time period, etc.). To enable efficient execution of idempotent tasks, the idempotency service 160 can maintain execution records for tasks, indicating prior executions of the tasks as well as state information for dependencies during those prior executions (e.g., data on content of the dependencies, hashes of those contents, version numbers of the dependencies, modification times of the dependencies, etc.). Execution records can be stored and maintained within an execution record data store 164. The idempotency service 160 can further include a configuration data store 166 including information designating dependencies of various tasks, as well as how to compare state of those dependencies between executions. Illustratively, the configuration data store 166 may include information provided by a user of a task, such as whether a task should be considered idempotent, what dependencies of the task should be considered with respect to idempotency (e.g., which parameters of the task, which external resources, whether code of the task itself is a dependency, etc.), what aspects of the dependency should be considered as representative of state (e.g., complete content, hash value, version number, modification timestamp, etc.), and what function or operation should be used to compare a current state of the dependency with a state during prior execution. Both the execution record data store 164 and the configuration data store 166 may correspond to any persistent or substantially persistent data storage, such as a hard drive (HDD), a solid state drive (SDD), network attached storage (NAS), a tape drive, or any combination thereof. In addition, the idempotency service 160 can include an idempotency controller 162. As described in more detail below, the idempotency controller 162 can function to obtain from the frontend 120 information regarding a call to execute a task, and to instruct the frontend 120 as to how to handle the call. Illustratively, the idempotency controller 162 may instruct the frontend 120 not to execute a call where no state of a dependency of the call has altered since a prior call to execute the task. Alternatively, the idempotency controller 162 may instruct the frontend 120 to execute the task, when a state of at least one dependency of the task has changed since a prior execution.

In one embodiment, a number of frontends 120 and/or worker managers 140 may share access to a common the idempotency controller 162. In another embodiment, each frontend 120 and/or worker manager 140 may be associated with a different idempotency controller 162. The use of different idempotency controllers 162 for each frontend 120 or worker manager 140 may reduce the complexity or delays caused, for example, by multiple frontends 120 or worker managers 140 sharing access to a single idempotency controller 162. To reduce the risk that different execution records for a given task are stored in different the idempotency controllers 162, the frontends 120 and/or worker managers 140 may be configured to distribute a given task (or a given combination of task and parameters) to the same worker manager 140 in all (or nearly all) instances, such that that same worker manager 140 communicates with an "authoritative" idempotency controller 162 for the task. In the instance that a different worker manager 140 obtains a call to execute the task (e.g., due to load balancing), the worker manger 140 may query another idempotency controller 162 that is considered "authoritative" for the task, or query another worker manager 140 associated with that idempotency controller 162, and utilize a response of that idempotency controller 162 in determining whether to execute the task.

While some functionalities are generally described herein with reference to an individual component of the on-demand code execution system 110, other components or a combination of components may additionally or alternatively implement such functionalities. For example, while a frontend 120 may interact with an idempotency controller 162 to determine whether to execute a task given the states of dependencies of that task, a worker manager 140 may additionally or alternatively interact with the idempotency controller 162 to determine whether to execute the task given the states of dependencies. In some instances, a frontend 120 may interact with an idempotency controller 162 to determine whether to query a task for execution in response to a call (where queuing may not occur if states of dependencies match a prior execution), while a worker manager 140 interacts with the idempotency controller 162 to determine whether to actually execute the task (e.g., such that an intervening, separate execution of the task would result in the worker manager 140 declining to execute the task, even when it was previously queued).

Figure 2:
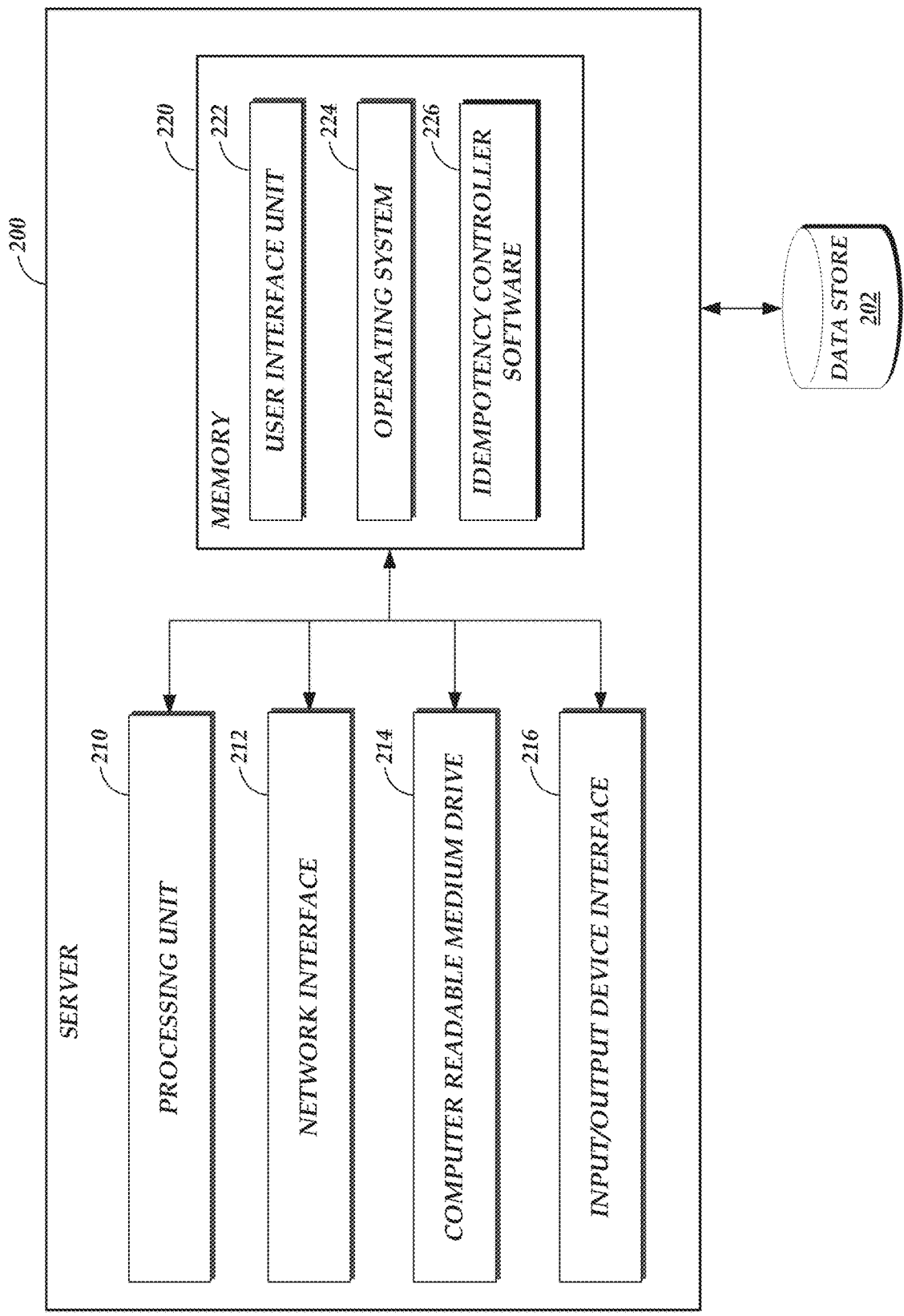
FIG. 2 depicts a general architecture of a computing device providing a idempotency controller of FIG. 1.

FIG. 2 depicts a general architecture of a computing system (referenced as server 200) that implements embodiments of the present disclosure to enable execution guarantees on the on-demand code execution system 110. Illustratively, the server 200 may operate to implement an idempotency controller 162 of FIG. 1. The general architecture of the server 200 depicted in FIG. 2 includes an arrangement of computer hardware and software modules that may be used to implement aspects of the present disclosure. The hardware modules may be implemented with physical electronic devices, as discussed in greater detail below. The server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the server 200 includes a processing unit 210, a network interface 212, a computer readable medium drive 214, and an input/output device interface 216, all of which may communicate with one another by way of a communication bus. The network interface 212 may provide connectivity to one or more networks or computing systems. The processing unit 210 may thus receive information and instructions from other computing systems or services via the network 104. The processing unit 210 may also communicate to and from memory 220 and further provide output information for an optional display (not shown) via the input/output device interface 216. The input/output device interface 216 may also accept input from an optional input device (not shown).

The memory 220 may contain computer program instructions (grouped as modules in some embodiments) that the processing unit 210 executes in order to implement one or more aspects of the present disclosure. The memory 210 generally includes RAM, ROM and/or other persistent, auxiliary or non-transitory computer readable media. The memory 210 may store an operating system 224 that provides computer program instructions for use by the processing unit 210 in the general administration and operation of the server 200. The memory 220 may further include computer program instructions and other information for implementing aspects of the present disclosure. For example, in one embodiment, the memory 220 includes a user interface unit 222 that generates user interfaces (and/or instructions therefor) for display upon a computing device, e.g., via a navigation and/or browsing interface such as a browser or application installed on the computing device. In addition, the memory 220 may include and/or communicate with one or more data repositories, such as the data store 202, which may correspond to any persistent or substantially persistent data storage, such as a hard drive (HDD), a solid state drive (SDD), network attached storage (NAS), a tape drive, or any combination thereof.

In addition to and/or in combination with the user interface unit 222, the memory 220 may include idempotency controller software 226 that may be executed by the processing unit 210. In one embodiment, the user interface unit 222 and the idempotency controller software 226 individually or collectively implement various aspects of the present disclosure, e.g., determining whether states of dependencies of a task match states during a prior execution, and executing the task when (and potentially only when) a state of at least one dependency varies from a prior execution.

While the user interface unit 222 and idempotency controller software 226 are shown in FIG. 2 as part of a server 200 implementing an idempotency controller 162, in other embodiments, all or a portion of the user interface unit 222 and idempotency controller software 226 may be implemented by other components of the on-demand code execution system 110 and/or another computing device. For example, in certain embodiments of the present disclosure, a frontend 120 or worker manager 140 may include several modules or components that operate similarly to the modules and components illustrated as part of the server 200.

Figure 3A:
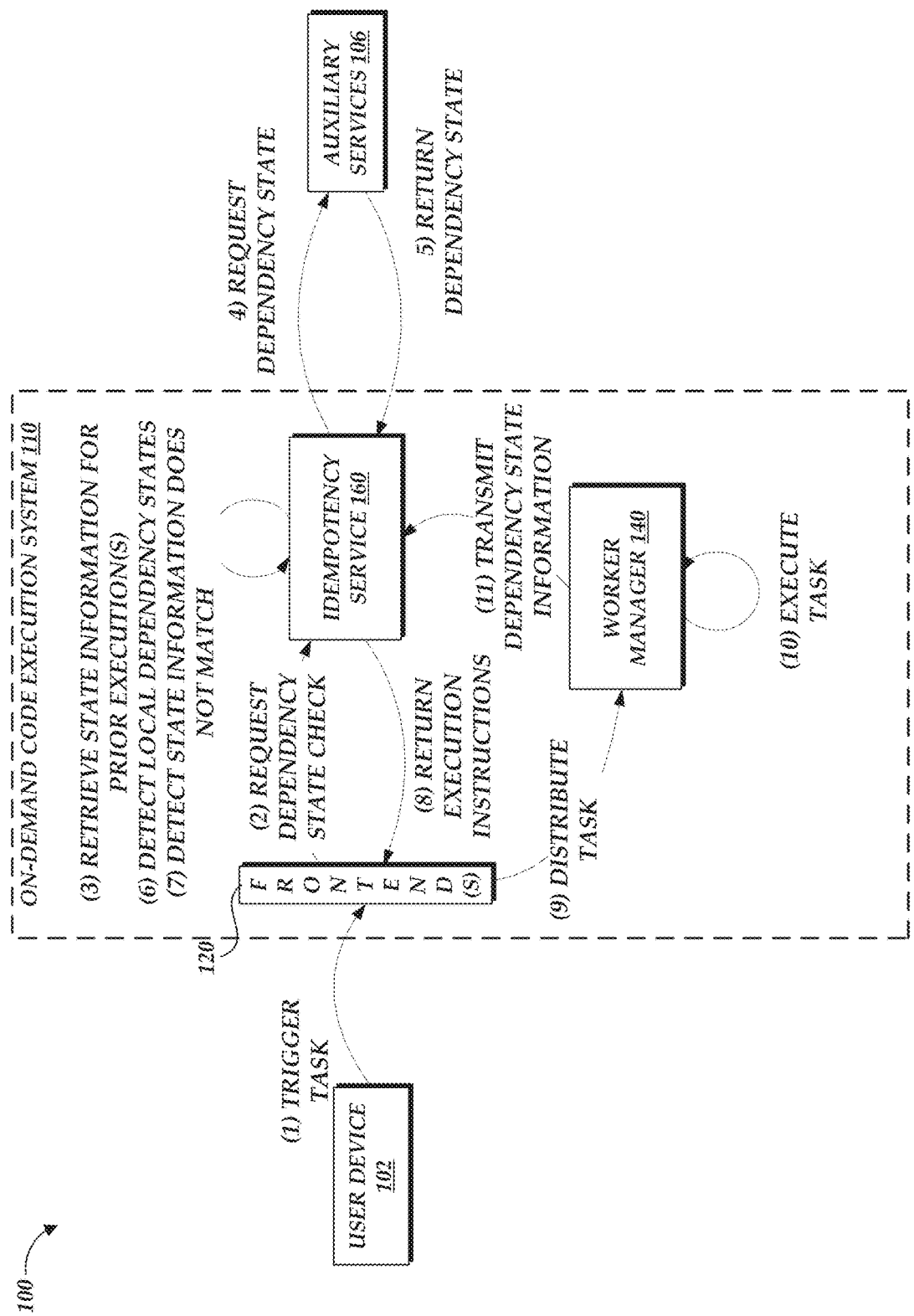
FIGS. 3A and 3B are flow diagrams depicting illustrative interactions for implementing idempotent on the on-demand code execution system of FIG. 1.
Figure 3B:
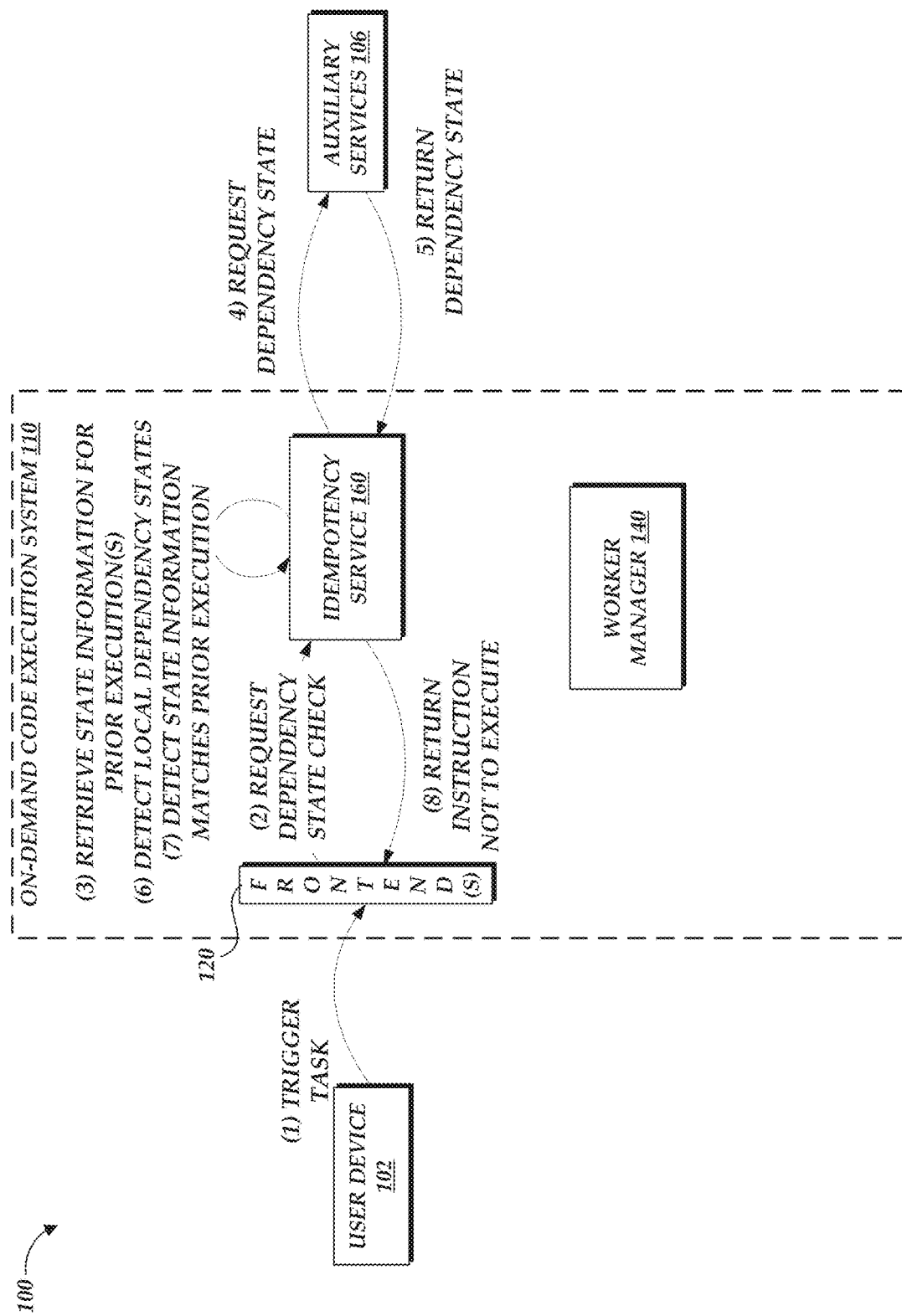

With reference to FIGS. 3A and 3B, illustrative interactions are depicted for implementing efficient execution of idempotent tasks in the on-demand code execution system 110, by declining to execute tasks in response to task calls, where states of dependencies of the task match states during a prior execution. Specifically, FIG. 3A depicts interactions for handling a call to execute a task, where dependency states for the task do not match a prior execution (e.g., due to a change in those dependency states or due to there being no record of prior executions). FIG. 3B depicts interactions for handling a call to execute a task where dependency states for the task match a prior execution, and thus, no additional execution need occur (because no different outcome would result).

The interactions of FIG. 3A begin at (1), where a user device 102 submits to a frontend 120 a call to a task on the on-demand code execution system. As noted above, submission of a call may include transmission of specialized data to the frontend 120, such as a HTTP packet or API call referencing the task alias. While the interactions of FIG. 3A are described as including an explicit call to the task by the user device 102, calls to the task may occur in a variety of manners, including submission of a call by auxiliary services 106 (not shown in FIG. 3A) or generation of a call by the on-demand code execution system 110 (e.g., based on a rule to call the alias when specific criteria are met, such as elapsing of a period of time or detection of data on an auxiliary service 106). The call may include any information required to execute the task, such as parameters for execution, authentication information under which to execute the task or to be used during execution of the task, etc.

Thereafter, at (2), the frontend 120 transmits a request to the idempotency service 160 to check whether dependency states of the task match a prior execution. At (3), the idempotency service 160 obtains state information for one or more prior executions of the task, such as by retrieving an execution record of the task from the execution record data store 164 of FIG. 1. Illustratively, the execution record may indicate, for each dependency of the task (e.g., as designated by a user owning the task or as automatically detected by the on-demand code execution system by analysis of parameters of the task, or by dynamic or static analysis of code corresponding to the task), a state of the dependency during a prior execution. As noted above, the state of a dependency during a prior execution may be indicated by any information usable to compare that state with a state of the dependency during a subsequent execution. For example, state may be indicated by content of a dependency (e.g., a file itself), a hash value of that content, a version identifier for the dependency, a "last modified" record for the dependency, etc.

In one embodiment, the idempotency service 160 may retrieve an execution record for only an immediately prior execution, such that a call to execute a task will result in execution of the task, unless it is duplicative with an immediately prior execution of the task. In another embodiment, the idempotency service 160 may retrieve all prior execution records, or all prior execution records within a threshold time period, such that a call to execute a task will result in execution of the task if current states of the dependencies of the task do not match corresponding states during any past execution. In some instances, a user associated with a task may designate which execution records should be considered by the idempotency service 160.

In addition, the idempotency service 160 can determine current states of the dependencies of a task. Illustratively, where a dependency of a task is a resource associated with an auxiliary service 106 (e.g., a database record, a file, a network resource, etc.), the idempotency service 160, at (4) can request a state of the dependency from the auxiliary service 106. The auxiliary server 106, in turn, can return information regarding the dependency state, at (5). The information regarding a current state of a dependency retrieved from the auxiliary server 106 may vary according to the information maintained at the idempotency service 160 regarding a past state of the dependency, as well as according to how that current and past state information is compared. For example, where a past dependency state is recorded as the actual content of a dependency resource during a past execution, the idempotency service 160 may retrieve the current content of that resource. Where past dependency state is recorded as a hash value of a dependency resource during a past execution, the idempotency service 160 may retrieve either the current content of that resource (e.g., and generate a hash value), or may request that the auxiliary service 106 provide the hash value of the content of the resource. Where past dependency state is recorded as version number of the resource, the idempotency service 160 may retrieve the version number of the resource from the auxiliary service 106. In some instances, rather than retrieving state information of a dependency, the idempotency service 160 may request that the auxiliary service 106 indicate whether a state of the dependency has changed. For example, the idempotency service 160 may request that an auxiliary server 106 indicate whether "version n" of a dependency is the most up-to-date version held by the auxiliary server 106.

In addition, at (6), the idempotency service 160 can obtain information regarding the state of any local dependencies (e.g., dependencies related to a state of the on-demand code execution system 110 or a portion thereof). For example, local dependencies may include a state of the code corresponding to a called task, a state of an execution environment of the code, or a state of another aspect of the on-demand code execution system 110 (e.g., a version number for the system 110 itself).

In the scenario of FIG. 3A, it is assumed that the state of at least on dependency of a task has changed since a prior execution. According, at (5), the idempotency service 160 compares the dependency state information included in past execution records with current dependency state information, in order to detect that state information for current dependencies does not match that of a prior execution.

Illustratively, this may indicate that a resource referenced by a parameter passed to the task has changed, that the code of the task has changed, that an external resource referenced within the task has changed, or that other dependencies of the task have changed such that execution of the code might result in a different outcome than a prior execution. In one embodiment, the comparison between current state information and state information of a dependency indicated in a prior execution record may be defined at least in part by a user associated with the task (e.g. a task "owner"). For example, the user may specify that, if a current hash value for a dependency matches a current hash value of a prior dependency, the state of the dependency should be considered to be matched. As another example, where a task corresponds to code to add an item passed as parameter to a database, a user may specify that a state of the dependency (e.g., the state of the database) should be considered to match a prior state so long as the item is already reflected in the database.

As noted above, in the scenario of FIG. 3A, it is assumed that the state of at least on dependency of a task has changed since a prior execution. Thus, after detecting that state change, the idempotency server 160, at (8), returns instructions to the frontend 120 to execute the task. The frontend 120, in turn, distributes the task to a worker manager 140 at (9). While not shown in FIG. 3A, in some instances the frontend 120 may perform additional operations prior to distributing the task to the worker manager 140, such as determining whether sufficient capacity exists to execute the task, queuing the task, determining accounts to which to attribute execution of the task, etc. Such operations are described in more detail in the '556 patent.

At (10), the worker manager 140 then executes the task. Execution of tasks is described in more detail within the in the '556 patent. In some instances, the worker manager 140 or other components of the on-demand code execution system 110 may implement additional functionality with regard to execution of the task. For example, the on-demand code execution system 110 may utilize aspects of a call to a task to "guarantee" execution of the task, or to rollback execution of the task in response to errors. Systems and methods for implementing execution guarantees with respect to tasks on an on-demand code execution system are described in more detail in U.S. patent application Ser. No. 15/275,181, by Timothy Allen Wagner, Marc John Brooker, Jonathan Paul Thompson, and Ajay Nair, filed concurrently herewith on Sep. 23, 2016, and entitled "EXECUTION GUARANTEES IN AN ON-DEMAND NETWORK CODE EXECUTION SYSTEM" (the "181 application"). As a further example, the on-demand code may implement efficient handling of tasks that execute asynchronously, as described in in more detail in U.S. patent application Ser. No. 15/195,897, filed Jun. 28, 2016, and entitled "ASYNCHRONOUS TASK MANAGEMENT IN AN ON-DEMAND NETWORK CODE EXECUTION ENVIRONMENT" (the "'897 application"). Both the '181 and the '897 applications are hereby incorporated by reference.

At (11), the worker manager 140 transmits to the idempotency server 160 a record of dependency states for the task during execution, such that these states can be stored by the idempotency service 160 (e.g., in an execution record for the task), and compared against dependency states during future calls. In one embodiment, the worker manager 140 transmits the states for each dependency of a task that are actually used during execution of a task (e.g., a state of the code that is loaded to execute a task, a state of a resource that is accessed by the task, etc.). Thus, the state information can be expected to represent a state of a dependency with near certain accuracy. In other instances, the worker manager 140 may transmit state information of a dependency at a point prior to execution of the task (e.g., to reduce the need for dependency state information to be generated during execution of a task itself). In some instances, the worker manager 140 may forego transmitting state information for a dependency to the idempotency server 160, and the idempotency server 160 may assume that the state information previously gathered (e.g., at interactions (4)-(6)) reflect states of the dependencies during execution. This assumption may, for example, reduce the need for a worker manager 140 to determine and report state information to the idempotency service 160. According, while the phrase "during execution" is used herein to denote dependency states recorded as corresponding to a given execution of a task, this state information may be gathered at other points in time than during actual execution of the code of a task. In addition to state information for dependencies, the worker manager 140 may additionally store transmit any result of execution of the task to the idempotency service 160, which may be utilized to service subsequent requests to execute the task, without actually requiring additional executions of the task.

One of skill in the art will appreciate that the interactions described above with respect to FIG. 3A may vary in different embodiments of the present disclosure. For example, as noted above, in some instances the frontend 120 may be configured to queue tasks, prior to distribution of the task to a worker manager 140 (e.g., because a worker manager 140 may have limited capacity to execute tasks). Such queuing may result in dependency states for a task varying (e.g., due to execution of other tasks, due to uploading of new code for a task by a user, due to factors external to the on-demand code execution system 110, etc.). Accordingly, in addition or alternatively to conducting a dependency state check at the time that a call to a task is received, the frontend 120 may request a dependency state check after dequeuing an execution of the task, and prior to distributing the task to a worker manager 140. Similarly, a worker manager 140 may request a dependency state check from the idempotency service 160 and process execution instructions returned from the idempotency server 160 to determine whether execution of a task should proceed (e.g., in the same manner described above with respect to the frontend 120). This functionality of the worker manager 140 may occur in addition or as an alternative to implementation of dependency state checks at the frontend 120.

As noted above, FIG. 3B depicts illustrative interactions occurring in response to a call to execute an idempotent task, under a scenario in which states for dependencies of the task match states of those dependencies during a prior execution (e.g., an immediately prior execution, any prior execution, etc.). Thus, the interactions of FIG. 3B depict an instance in which the on-demand code execution system 110 may decline to execute a task in response to a task call, as doing so is assumed to have no effect. Implementation of the interactions of FIG. 3B thus enable the on-demand execution system 110 to "safely ignore" task calls, reducing the computing resources that would otherwise be needed to execute a task in response to a call.

Interactions (1) through (6) of FIG. 3B mirror corresponding interactions of FIG. 3A, above, and thus will not be described in detail. However, in brief, these interactions relate to triggering of a task at the on-demand code execution system 110, and to conducting a dependency state check for the task, to determine whether execution should proceed. The dependency state check can include gathering current state information for each dependency of a task, and comparing that state information to a record of state information of the dependencies during a prior execution.

In the scenario of FIG. 3B, it is assumed that current state information for each dependency of a task matches state information for a prior dependency, as determined by the idempotency service 160 at (7). Illustratively, the idempotency server 160 may determine, for each dependency of a task, that no alteration in state for the dependency has occurred since a prior execution of the task. As another illustration, idempotency server 160 may determine, for each dependency of a task, that a state of the dependency matches a state of the dependency during a given prior execution (even when that prior execution is not the most recent prior execution). As noted above, the prior executions that should be considered for the purposes of matching dependency states of a current execution may be defined, for example, by a user owning a task (e.g., as all prior executions, prior executions in a given timeframe, only an immediately prior execution, etc.).

Because the idempotency service 160 has verified, in FIG. 3B, that current state information for each dependency of a task matches dependency state information for a prior execution, the idempotency server 160 can return instructions to the frontend 120 not to continue with execution of the task (as such execution is predicted to have no effect). While not shown in FIG. 3B, the frontend 120 may in some instances notify a user associated with the task that the call did not result in execution of the task. In some instances, the frontend 120 may retrieve an result of a prior execution of the task (e.g., as stored within the execution record by the idempotency service 160), and return the result to a calling device (e.g., user device 102).

As noted above with respect to FIG. 3A, while interactions of FIG. 3B are described with respect to a frontend 120, these interactions may additionally or alternatively involve a worker manager 140, who may, in a manner similar to the frontend 120, request a dependency state check from the idempotency server 160 and process instructions form the idempotency service 160 not to proceed with execution of a task. In addition, the interactions of FIG. 3B may occur at multiple or various times, such as prior to queuing of an execution, after dequeuing, or just prior to beginning execution of a task.

Figure 4:
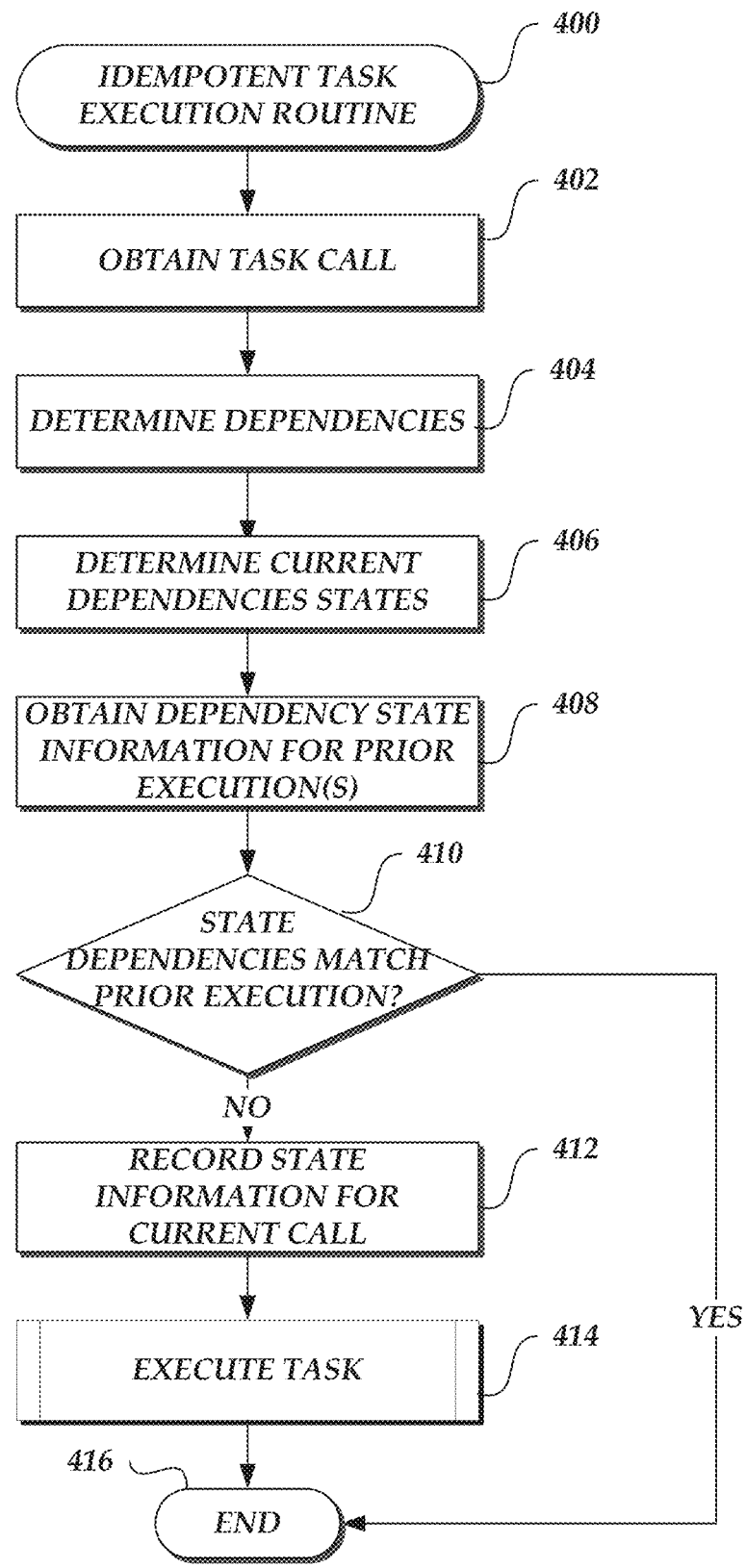
FIG. 4 is a flow chart depicting an illustrative routine for implementing idempotent execution of task according to aspects of the present disclosure.

With reference to FIG. 4, a block diagram depicting an illustrative routine 400 for executing idempotent tasks on an on-demand code execution system 110 will be described. The routine 400 begins at block 402, where the on-demand code execution system 110 (e.g., via a frontend 120) receives a call to execute an idempotent task. At block 404, the on-demand code execution system 110 (e.g., via an idempotency service 160) determines dependencies for the called task. Illustratively, the on-demand code execution system 110 may automatically determine dependencies for a task, such as by determining that each parameter for at ask represents a dependency, that the source code of the task represents a dependency, and that any information retrieved from external source during execution of a task represents a dependency. In some instances, the on-demand code execution system 110 may determine dependencies at least in part based on designations of a user associated with a task.

At block 406, the on-demand code execution system 110 (e.g., via an idempotency service 160) determines current state information for the dependencies. The state information may be retrieved locally at the on-demand code execution system 110, such as by obtaining a hash value for a source code file corresponding to the task, or externally from the on-demand code execution system 110, such as by requesting state information from an auxiliary service.

At block 408, the on-demand code execution system 110 (e.g., via an idempotency service 160) determines state information for the dependencies of the task that corresponds to one or more prior executions. Illustratively, the state information may be retrieved from an execution record of the task, which may indicate, for a given dependency, a value or other designator for a state of that dependency during a prior execution. In some instances, state information may be retrieved for a single prior execution, such as an immediately prior execution. In other instances, state information may be retrieved for multiple prior executions (e.g., all prior executions, prior executions in a threshold past period of time, etc.).

At block 410, the on-demand code execution system 110 (e.g., via an idempotency service 160) determines whether current state information for dependencies of a task matches state information for those dependencies during a given prior execution. Illustratively, an idempotency service 160 may compare current and past state information for each dependency to determine whether a change has occurred in that dependency. In some instances, the comparison may be controlled, at least in part, based on information specified by a user associated with the task. Illustratively, a user may specify an operation, algorithm, or function that should be run against either or both current and prior state information, to determine whether the current dependency state indicates that execution of the task should proceed. In some instances, the operation, algorithm, or function may be encompassed within a distinct task executing on the on-demand code execution system.

If, at block 410, current dependency states for a task match prior dependency states corresponding to a prior execution, the on-demand code execution system 110 can decline to execute the task in response to the call, as such execution is predicted to be unnecessary. Thus, the routine 400 proceeds to block 416 and ends.

Alternatively, if at block 410 current dependency states for a task does not match prior dependency states corresponding to a prior execution, the routine 400 proceeds to block 412, where the on-demand code execution system 110 records dependency state information for the task, as associated with a new execution of the task. The routine 400 then proceeds to block 414, where the task is executed on the on-demand code execution system 110. Details regarding execution of a task on the on-demand code execution system 110 are provided within the '556 patent, incorporated by reference above. In some instances, execution of a task may include additional functionality, such as implementation of execution guarantees or modification of the execution to handle asynchronous task calls. These functionalities are described in more detail in the '181 and '897 applications incorporated by reference above.

One of skill in the art will appreciate that the interactions of the routine 400 may vary across embodiments of the present disclosure. For example, while comparison of current and past dependency states is described above as occurring at the on-demand code execution system 110, such comparison may additionally or alternatively occur on external systems, such as auxiliary services. Illustratively, the on-demand code execution system 110 may transmit a request to an auxiliary service to determine whether a state of a dependency during a past execution matches a current state of the dependency. The on-demand code execution system 110 may then utilize a response from the auxiliary service as authoritative. Accordingly, the interactions of FIG. 4 are intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
obtaining a first request to cause execution of a task, wherein the task is associated with code executable by an on-demand code execution system to implement functionality corresponding to the task, and wherein execution of the task is dependent on a set of resources;
generating an execution environment for the task on the on-demand code execution system at least partly by provisioning the execution environment with the code;
initiating a first execution of the task at least partly by executing the code within the execution environment;
determining states of respective resources, within the set of resources, at a time of the first execution of the task;
obtaining a second request to cause execution of the task;
for individual resources of the set of resources, comparing updated current states of the individual resources and the states of the respective resources at the time of the first execution of the task to determine that the current states of the individual resources match the states of the respective resources at the time of the first execution of the task; and
declining to initiate a second execution of the task in response to the second request.

2. The computer-implemented method of claim 1 further comprising:
obtaining a third request to cause execution of the task;
for individual resources of the set of resources, comparing current states of the individual resources at a time of the third request and the states of the respective resources at the time of the first execution of the task to determine that a current state of at least one resource, from the set of resources, does not match the state of the at least one resource at the time of the first execution; and
executing the code to implement functionality corresponding to the task.

3. The computer-implemented method of claim 2, wherein the third request occurs prior to the second request.

4. The computer-implemented method of claim 1 further comprising:
obtaining a result of the first execution of the task; and
returning the result as a result of the request to cause the second execution of the task.

5. The computer-implemented method of claim 1, wherein the set of resources include at least one of the code associated with the task, a resource referenced by a parameter passed within the request, or a resource referenced by the code associated with the task.

6. The computer-implemented method of claim 1 further comprising generating an execution record for the task indicating the states of the respect resources within the set of resources at the time of the first execution, wherein determining the states of the respective resources at the time of the first execution comprises obtaining the states of the respective resources from the execution record.

7. The computer-implemented method of claim 6, wherein the execution record for the task indicates the states of the respective resources at each of a set of prior executions of the task, and wherein the computer-implemented method further comprises identifying the first execution from the set of prior executions.

8. A system comprising:
a data store including computer-executable instructions; and
a physical processor configured to execute the computer-executable instructions, wherein execution of the computer-executable instructions causes the system to:
obtain a first request to cause execution of a task, wherein the task is associated with code executable by an on-demand code execution system to implement functionality corresponding to the task, and wherein execution of the task is dependent on at least one resource;
generate an execution environment for the task on the on-demand code execution system at least partly by provisioning the execution environment with the code;

initiate a first execution of the task at least partly by executing the code within the execution environment;
determine a state of the at least one resource at a time of the first execution of the task;
obtain a second request to cause execution of the task;
determine that a current state of the at least one resource matches the state of the at least one resource at the time of the first execution; and
end processing of the second request to cause execution of the task without initiating a second execution of the task.

9. The system of claim 8, wherein the at least one resource corresponds to a plurality of resources, and wherein determining that the current state of the at least one resource matches the state of the at least one resource at the time of the first execution comprises determining that the current state of every individual resource within the plurality of resources matches a state of the respective individual resource at the time of the first execution.

10. The system of claim 8, wherein execution of the computer-executable instructions further causes the system to:
obtain a third request to cause execution of the task;
determine that the current state of the at least one resource does not match the state of the at least one resource at the time of the first execution; and
execute the code to implement functionality corresponding to the task.

11. The system of claim 8, wherein the at least one resource corresponds to a plurality of resources, and wherein determining that the current state of the at least one resource does not match the state of the at least one resource at the time of the first execution comprises determining that any individual resource within the plurality of resources does not match a state of the individual resource at the time of the first execution.

12. The system of claim 8, wherein execution of the computer-executable instructions further causes the system to return an indication that the second request to execute the task is satisfied without execution of the code.

13. The system of claim 8, wherein execution of the computer-executable instructions further causes the system to identify the at least one resource based at least partly on at least one of static or dynamic analysis of the code associated with the task.

14. The system of claim 8, wherein execution of the computer-executable instructions further causes the system to generate an execution record for the task indicating a state of the at least one resource at the time of the first execution, and wherein determining the state of the at least one resource at the time of the first execution comprises obtaining the state of the at least one resource from the execution record.

15. The system of claim 8, wherein the execution record for the task indicates the states of the at least one resource at each of a set of prior executions of the task, and wherein execution of the computer-executable instructions further causes the system to identify the first execution from the set of prior executions.

16. Non-transitory computer-readable media comprising computer-executable instructions that, when executed, cause a system to:
obtain a first request to cause execution of a task, wherein the task is associated with code executable by an on-demand code execution system to implement functionality corresponding to the task, and wherein execution of the task is dependent on at least one resource;
generate an execution environment for the task on the on-demand code execution system at least partly by provisioning the execution environment with the code;
initiate a first execution of the task at least partly by executing the code within the execution environment;
determine a state of the at least one resource at a time of the first execution of the task;
obtain a second request to cause execution of the task;
determine that a current state of the at least one resource matches the state of the at least one resource at the time of the first execution; and
end processing of the second request to cause execution of the task without initiating a second execution of the task.

17. The non-transitory computer-readable media of claim 16, wherein the first execution is a most recent execution of the task prior to the second request.

18. The non-transitory computer-readable media of claim 16, wherein the computer-executable instructions, when executed, further cause a system to:
obtain a third request to cause execution of the task;
determine that the current state of the at least one resource does not match the state of the at least one resource at the time of the first execution; and
initiate a second execution of the code to implement functionality corresponding to the task.

19. The non-transitory computer-readable media of claim 16, wherein the second request occurs subsequent to the second execution.

20. The non-transitory computer-readable media of claim 16, wherein the at least one resource corresponds to a plurality of resources, and wherein, to determine that the current state of the at least one resource matches the state of the at least one resource at the time of the first execution, execution of the computer-executable instructions further causes the system to determine that the current state of every individual resource within the plurality of resources matches a state of the respective individual resource at the time of the first execution.

21. The non-transitory computer-readable media of claim 16, wherein the at least one resource corresponds to a plurality of resources, and wherein, to determine that the current state of the at least one resource does not match the state of the at least one resource at the time of the first execution, execution of the computer-executable instructions further causes the system to determine that any individual resource within the plurality of resources does not match a state of the individual resource at the time of the first execution.

* * * * *

UNITED STATES PATENT AND TRADEMARK OFFICE
CERTIFICATE OF CORRECTION

PATENT NO. : 10,528,390 B2
APPLICATION NO. : 16/113887
DATED : January 7, 2020
INVENTOR(S) : Brooker et al.

Page 1 of 2

It is certified that error appears in the above-identified patent and that said Letters Patent is hereby corrected as shown below:

On the Title Page

On page 4, Column 2, item (56), other publications, Lines 49-50, delete "+48" and insert --?--.

In the Specification

Column 6, Line 30, delete "systems," and insert --systems;--.

Column 7, Line 36, delete "patent")," and insert --Patent"),--.

Column 8, Line 26, delete "=" and insert --≡--.

Column 8, Line 56, delete "programing" and insert --programming--.

Column 14, Line 11, delete "any cast" and insert --anycast--.

Column 19, Line 1, delete "patent," and insert --Patent,--.

Column 19, Line 3, delete "patent)." and insert --Patent).--.

Column 25, Line 32, delete "patent." and insert --Patent.--.

Column 25, Line 35, delete "patent." and insert --Patent.--.

Column 25, Line 49, delete ""181" and insert --"'181--.

Column 28, Line 49, delete "patent." and insert --Patent,--.

Signed and Sealed this
Seventh Day of April, 2020

Andrei Iancu
*Director of the United States Patent and Trademark Office*

In the Claims

Column 30, Line 7, Claim 1, delete "updated current" and insert --current--.